United States Patent [19]
Tolan

[11] Patent Number: 5,802,676
[45] Date of Patent: Sep. 8, 1998

[54] STRAP FOR SECURING A BUNDLED CORD AND THE LIKE

[75] Inventor: Nancy Jane Tolan, Derry, N.H.

[73] Assignee: Velcro Industries B.V., Curacao, Netherlands

[21] Appl. No.: 770,675

[22] Filed: Dec. 20, 1996

[51] Int. Cl.⁶ .................................................. B65D 63/00
[52] U.S. Cl. ...................... 24/16 R; 24/16 PB; 24/17 A; 24/30.5 P
[58] Field of Search ................................ 24/16 R, 16 PB, 24/17 AP, 30.5 P, 442, 306, 3.13; 248/74.3; 128/DIG. 15, DIG. 26

[56] References Cited

U.S. PATENT DOCUMENTS

| | | |
|---|---|---|
| 3,000,384 | 9/1961 | Piers . |
| 3,009,235 | 11/1961 | Mestral . |
| 3,197,830 | 8/1965 | Hoadlay ................................ 24/16 PB |
| 3,279,008 | 10/1966 | Wallach . |
| 3,307,872 | 3/1967 | Murcott . |
| 3,426,363 | 2/1969 | Girard . |
| 3,601,863 | 8/1971 | Dorsey .................................. 24/16 PB |
| 3,835,505 | 9/1974 | Shewbidge . |
| 3,947,927 | 4/1976 | Rosenthal . |
| 3,973,610 | 8/1976 | Ballin .................................... 24/16 PB |
| 3,990,454 | 11/1976 | Schlesinger ..................... 128/DIG. 26 |
| 4,149,540 | 4/1979 | Hasslinger . |
| 4,273,130 | 6/1981 | Simpson . |
| 4,569,348 | 2/1986 | Hasslinger . |
| 4,815,172 | 3/1989 | Ward . |
| 4,893,381 | 1/1990 | Frankel . |
| 4,939,818 | 7/1990 | Hahn . |
| 5,024,402 | 6/1991 | Hamel .................................... 24/16 PB |
| 5,048,158 | 9/1991 | Koerner . |
| 5,133,671 | 7/1992 | Boghosian ............................ 24/16 PB |
| 5,168,603 | 12/1992 | Reed . |
| 5,394,592 | 3/1995 | Quick .................................... 24/17 AP |

FOREIGN PATENT DOCUMENTS 698696  10/1953  United Kingdom .

*Primary Examiner*—Victor N. Sakran
*Attorney, Agent, or Firm*—Fish & Richardson P.C.

[57] ABSTRACT

A strap for securing a bundled power cord for convenient storage and a power tool having a power cord to which the strap is substantially permanently secured. The strap has fastening elements on two extended surfaces and a pair of slots through which the cord is passed to attach the strap to the cord. The slots, shown as slits, are sized relative to a plug on the cord so that the plug resists withdrawal of the cord from the slots and the flexible strap remains permanently on the cord without impeding the use of the power cord or tool. The attached strap is wrapped around the bundled cord, with the fastening elements on one side of the strap engaging the fastening elements on the other side of the strap to form a fastening and secure the cord. In preferred forms the strap is a flat strip of material carrying molded hooks on one side, synthetic resin integral with the hooks serving to secure loop material defining the opposite side of the strap.

16 Claims, 4 Drawing Sheets

STRAP FOR SECURING A BUNDLED CORD AND THE LIKE

BACKGROUND OF THE INVENTION

This invention relates to straps for securing bundled cords and the like, particularly straps with touch fasteners for securing power cords of electric tools and appliances for convenient storage.

There have been suggestions of use of touch fastener straps for bundling of cords and the like, but these have involved disadvantageous forming operations and other disadvantages. One such example known to the applicant is a permanently installed fastener employed to bundle power adaptor cords on laptop computers, consisting of an elongated length with loops on one side, and a short length with hooks. The short hook-comprising length is bonded to one end of the loop-comprising length, and the other end of the loop-comprising length is wrapped about the cord above the end plug and permanently bonded to the strap, in a heat staking operation, to form a single loop about the cord that is large enough to allow the cord to freely move through the strap but too small to pass the end plug.

SUMMARY OF THE INVENTION

It is realized that desirable qualities of a strap, including low cost of manufacture, capability of easy repetitive use, and a construction that enables the strap to be advantageously moved from one cord to another but helps to avoid misplacing the strap between uses, are achievable by the simple formation of two or more spaced slots in a two-sided touch fastener strap that is suitably sized to receive, and remain attached to, a section of an unbundled cord or other structure during use.

In one aspect of the invention, a unitary strap, useful for securing an arranged bundle of loops of a cord and the like, is provided. The strap comprises a first extended surface from which a multiplicity of fastener elements project, a second extended surface from which a multiplicity of fastener elements project, the elements of the second surface formed to mate with the elements of the first surface to form a disengageable fastening, and at least one pair of spaced slots. The slots are sized in length and positioned to pass the cord through both slots, with the strap material between the slots securing the strap to the cord. The strap is flexible and constructed and arranged such that in the wrapped state the fastener elements on the first and second surfaces form a disengageable fastening to secure the strap about the bundle.

Preferred embodiments of the invention contain one or more of the following features:

The strap is secured to a power cord, the strap being sized in length to be wrapped around a bundle of loops of the power cord.

The strap is of flat sheet form having first and second opposite faces. The first extended surface comprises substantially the entire face of the strap, and the second extended surface comprises substantially the entire opposite face of the strap. The material forming the fastener elements of the first and second surfaces is bonded throughout the extent of the strap.

The fasteners of the first surface are of molded synthetic resin. Sheet material carrying the fasteners of the second surface is intimately bonded by portions of synthetic resin integral with fastener elements of the first surface.

The fastener elements of the first surface are hook-shaped and the fastener elements of the second surface are loops provided on the surface of the fabric.

The slots comprise slits cut in the substance of the strap without removal of material.

In a preferred embodiment the strap is constructed for use with a cord having a plug of predetermined size, the slots being sufficiently long to permit passage of the plug through the slots, but sufficiently short to prevent ready withdrawal of the plug.

In another aspect of the invention a combination is provided of a power tool, a permanently attached power cord having an electrical plug on its end, and a strap as previously described. The strap is substantially permanently attached to the cord by insertion of the plug through the slots, the slots having a length preventing ready sliding of the plug out of the slots.

One embodiment includes a patch of fastener material permanently attached to the power tool, the patch comprising fastener elements engageable with fastener elements on the strap to form a disengageable fastening.

In another aspect of the invention, a method of securing an arranged bundle of loops of a power cord with a strap is provided. The strap comprises a first extended surface from which a multiplicity of fastener elements project, a second extended surface from which a multiplicity of fastener elements project, and at least one pair of spaced slots. The elements of the second surface are formed to mate with the elements of the first surface to form a disengageable fastening. The pair of spaced slots is sized in length and positioned to pass the cord through both slots, with the strap material between the slots securing the strap to the cord. The strap is flexible and sized in length to be wrapped around the bundle of loops, the strap constructed and arranged such that in the wrapped state the fastener elements on the first and second surfaces form a fastening to secure the strap about the bundle. The method comprises the steps of inserting the cord through the pair of slots in the strap, allowing the strap to remain attached to the cord when the cord is extended during use of the cord to deliver power, and after such use, forming the cord into a bundle of adjacent loops and wrapping the strap about the bundle such that the fastener elements on the first surface of the strap engage the fastener elements of the second surface of the strap to form a fastening.

DESCRIPTION OF THE PREFERRED EMBODIMENTS

Figure 1:
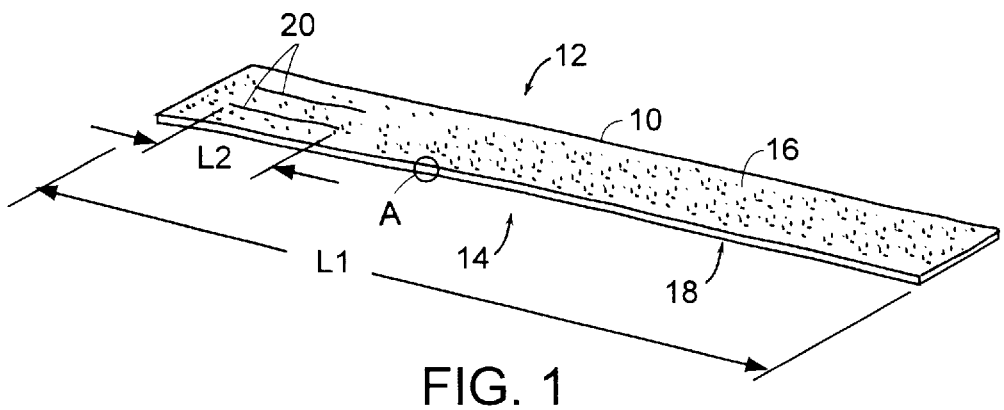
FIG. 1 is a perspective view of a strap, according to the invention.
Figure 1A:
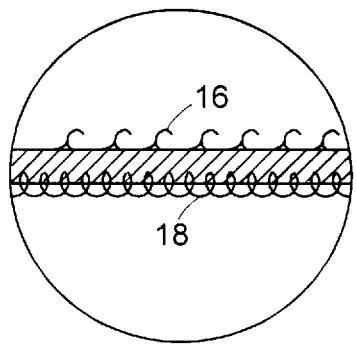
FIG. 1A is an enlarged plan view of area A in FIG. 1.

The figures illustrate the structure and function of a power cord strap according to the invention. Referring first to FIG. 1, the strap 10 is of elongated sheet form and comprises two opposing surfaces 12 and 14. Projecting from surface 12 is a multiplicity of touch fastener elements 16, with a multiplicity of touch fastener elements 18 projecting from surface 14. The form and structure of elements 16 and 18, broadly, is such that they are engageable to form a disengageable fastening. As shown in the preferred embodiment, elements 16 are of molded hook-shape and elements 18 are loop-shaped, together forming a hook-and-loop type fastening. Strap 10 is of sufficient length $L_1$ that the ends of the strap will substantially overlap when it is wrapped around the intended object, e.g. a bundled power cord.

Figure 2:
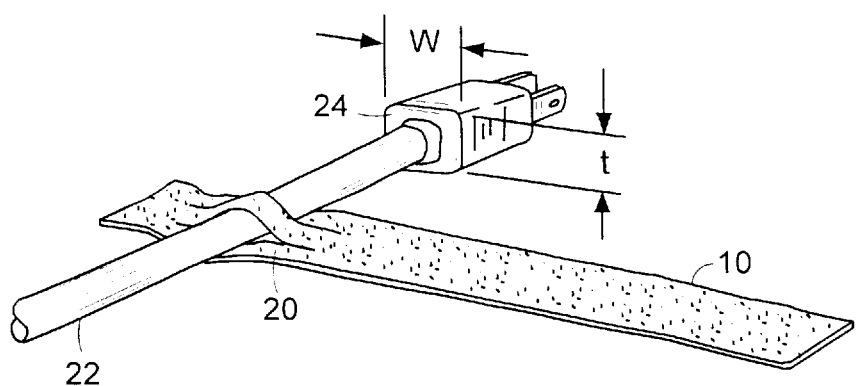
FIG. 2 shows the strap attached to a cord.

The strap has two slots 20 of length $L_2$, with $L_2$ long enough to permit plug 24 at the free end of a power cord 22 to pass through both slots by bending the strap material out of the plane of the strap. To this end, $L_2$ must be at least larger than half of the periphery of plug 24, half of the periphery being the sum of the width W and thickness t of the plug. When released, portions of the strap bear against both sides of the cord as shown in FIG. 2, and plug 24 serves as a stop to keep the strap on the cord. In this state strap 10 is substantially permanently attached to cord 22, may be positioned along the length of cord 22 by sliding the cord through slots 20, but if desired is easily removed by a reversal of the steps above.

The word "slot", as used herein, refers to an opening extending from one broad side of the strap to the other broad side, surrounded by strap material. The slot 20 is preferably elongated and of negligible width, preferably a cut slit formed without removal of material.

The two slots are positioned to leave sufficient durable margins of strap material to ensure that the strap remains on the cord.

Figure 3:
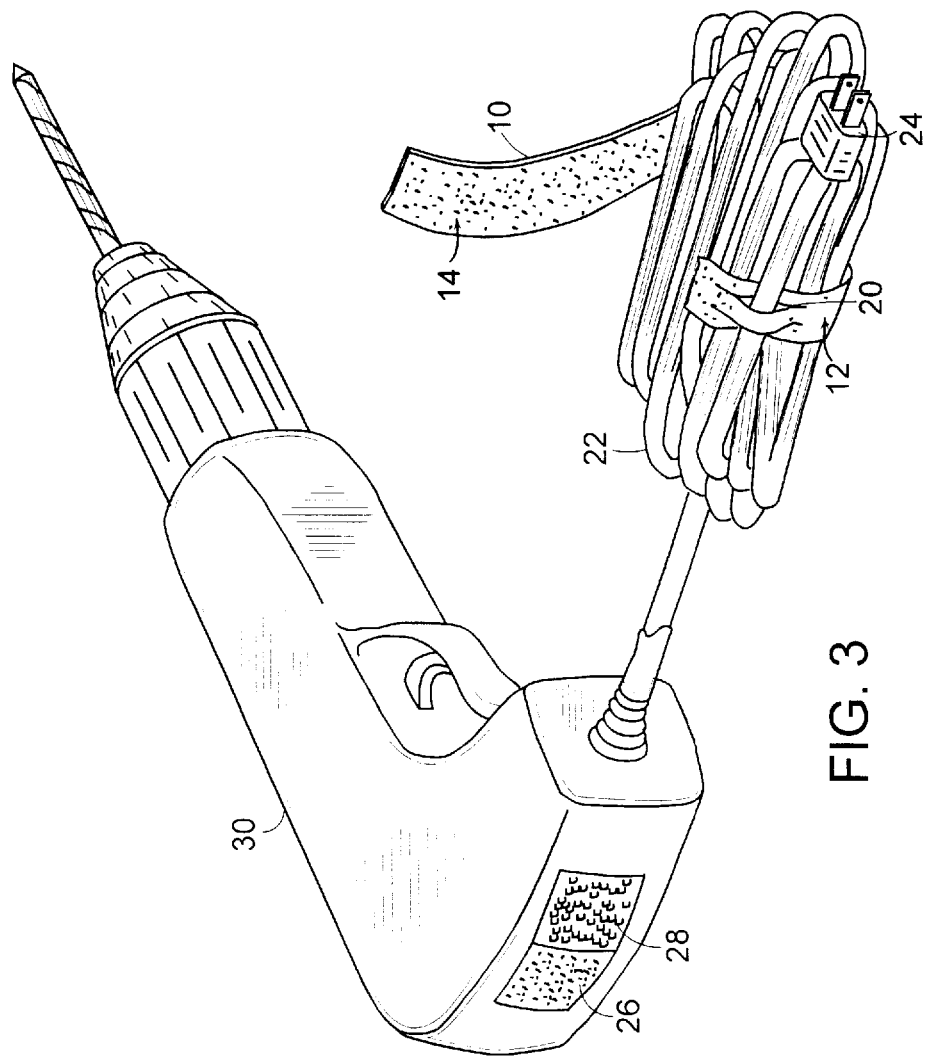
FIG. 3 shows the strap in the process of being wrapped around a bundled cord.

FIG. 3 shows cord 22, now bundled in a compact state for convenient storage, being wrapped by the attached strap 10. Ideally, strap 10 is under tension while cord 22 is being wrapped, keeping the bundle relatively tight and resulting in residual strap tension to help to keep the bundle together during storage.

Figure 4:
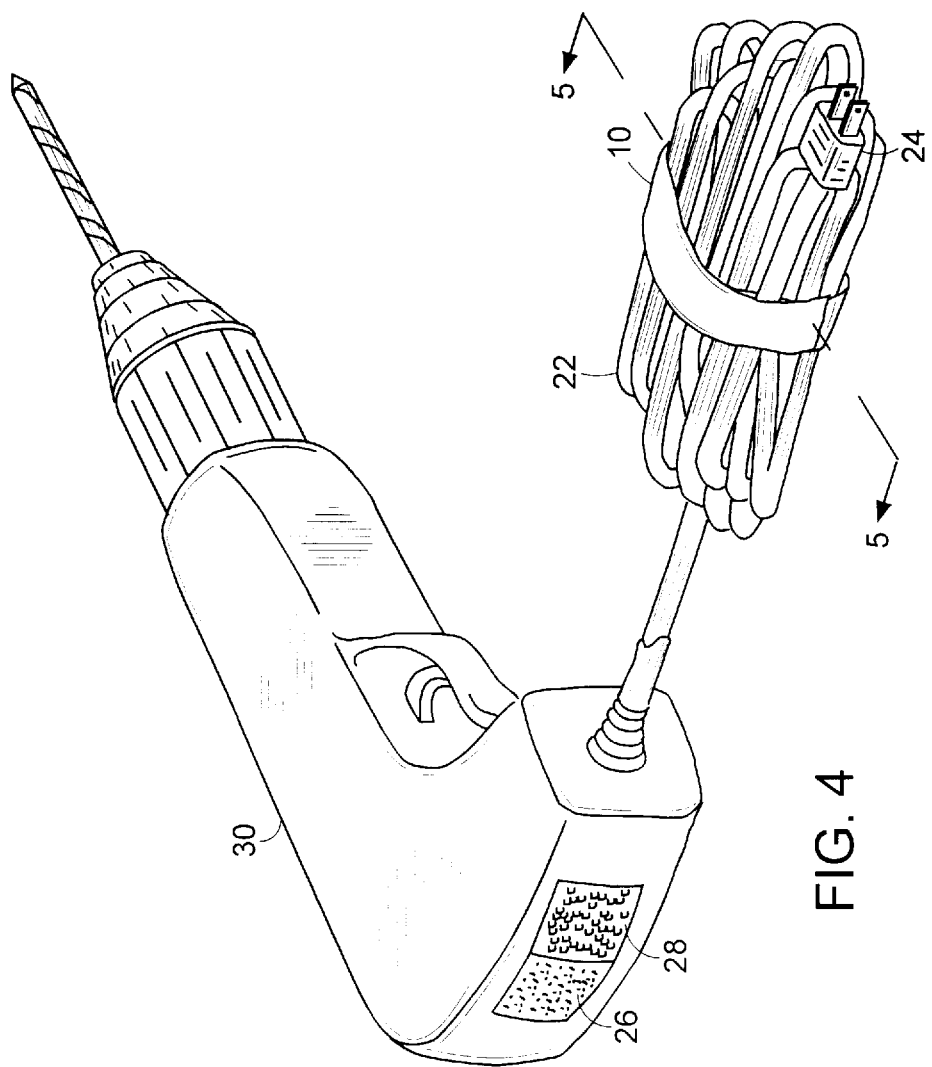
FIG. 4 shows the strap securing the cord in a bundled state
Figure 5:
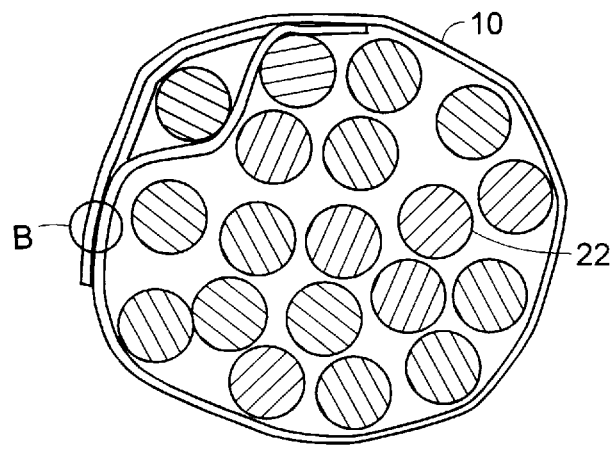
FIG. 5 is a cross-sectional view, taken along line 5—5 in FIG. 4.
Figure 6:
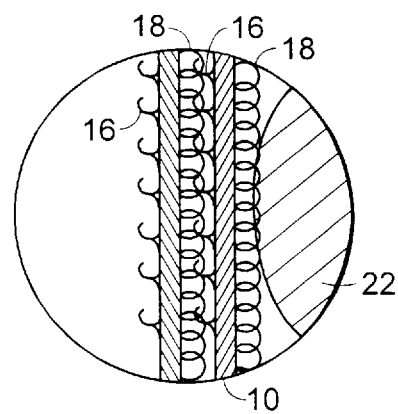
FIG. 6 is an enlarged view of area B in FIG. 5.

Strap 10 is wrapped around the bundle until fastener elements 16 engage fastener elements 18 to secure the bundle, as in FIGS. 4 and 5. In the preferred embodiment, hook elements 16 engage loop elements 18, as shown in FIG. 6.

In some configurations patches 26 and/or 28 of fastener material, comprising fastener elements cooperative with elements 16 and 18, respectively are permanently attached to tool 30 so that the wrapped cord bundle may be secured to the tool during storage by engaging the fastener elements of either patch with the exposed fastener elements on strap 10.

During use of the unbundled power cord it is advantageous that the strap remains on the cord in the vicinity of the plug, such that it does not impede use of the tool or appliance powered by the cord.

Other embodiments of the invention may employ fastener elements of different structures or shapes, as long as elements 16 and 18 are configured to engage to form a releasable fastening. For instance, mushroom fastener elements that mate with loops or with other formations may be used.

In the preferred embodiment, the strap material is a structure, configured and formed by the techniques as disclosed in U.S. Pat. Nos. 5,260,015 and 5,518,795, which are hereby incorporated by reference as if fully set forth. In the production of the material for use as the strap material, a sheet fabric carrying touch-fastener loops on one surface is introduced to one side of the nip during the molding process, by which its back surface is intimately bonded to a layer of synthetic resin material carrying integral fastener elements on the other surface. In certain preferred embodiments the sheet fabric is a pile fabric of woven or knit construction, and in other embodiments it is unwoven, having surface fibers that are anchored at both ends to function as loops.

In various embodiments the slots may be formed by cutting or slitting the molded material, or as part of the strap material molding process.

Other cords may likewise be bundled with straps according to the invention, suitably constructed for their purpose. Straps of this type may be used, for instance, on structures such as mooring or rigging lines that may have end enlargements such as knots, eyes, etc., or upon appliances themselves in which a section of the appliance extends through the slots.

Other features and embodiments will occur to those skilled in the art, and are covered by the following claims.

What is claimed is:

1. A strap useful for securing an arranged bundle of loops of a cord and the like, the strap comprising a unitary piece of two-sided, strip-form, touch fastener material having a first longitudinally extended surface from which a multiplicity of fastener elements project;

a second longitudinally extended surface from which a multiplicity of fastener elements project, the elements of the second surface formed to mate with the elements of the first surface to form a disengageable fastening there being respective fastener elements substantially throughout the length of the respective extended surfaces, which results in the strap being adjustable; and at least one pair of spaced slots sized in length and positioned to pass the cord through the slots, with the strap material between the slots securing the strap to the cord;

the strap being flexible and constructed and arranged such that in the wrapped state the fastener elements on the first and second surfaces form a disengageable fastening to secure the strap about the bundle.

2. The strap of claim 1 secured to a power cord, the strap being sized in length to be wrapped around a bundle of loops of the power cord.

3. The strap of claim 1 of flat sheet form having first and second opposite faces, in which the first extended surface comprises substantially the entire face of the strap; and the second extended surface comprises substantially the entire opposite face of the strap;

material forming the fastener elements of the first and second surfaces being bonded throughout the extent of the strap.

4. The strap of claim 3 in which the fasteners of the first surface are of molded synthetic resin, and sheet material carrying the fasteners of the second surface is intimately bonded by portions of synthetic resin integral with fastener elements of said first surface.

5. The strap of claim 1 in which the fastener elements of said first surface are hook-shaped and the fastener elements of said second surface are loops provided on the surface of the fabric.

6. The strap of claim 5 of flat sheet form having first and second opposite faces, in which the first extended surface comprises substantially the entire face of the strap the second extended surface comprises substantially the entire opposite face of the strap;

material forming the fastener elements of the first and second surfaces being bonded throughout the extent of the strap.

7. The strap of claim 6 in which the fasteners of the first surface are of molded synthetic resin, and sheet material carrying the fasteners of the second surface is intimately bonded by portions of synthetic resin integral with fastener elements of said first surface.

8. The strap of claim 1 in which said slots comprise slits cut in the substance of said strap without removal of material.

9. The strap of claim 1 constructed for use with a cord having a plug of predetermined size, the slots being sufficiently long to permit passage therethrough of said plug, but sufficiently short to prevent ready withdrawal of said plug.

10. In combination a power tool, a permanently attached power cord having an electrical plug on its end, and a strap according to claim 1 substantially permanently attached to said cord by insertion of said plug through the slots, the slots having a length preventing ready sliding of said plug out of said slots.

11. The combination of claim 10 further including a patch of fastener material permanently attached to the power tool, the patch comprising fastener elements engageable with fastener elements on the strap to form a disengageable fastening.

12. A method of securing an arranged bundle of loops of a power cord with a strap, the strap comprising a unitary piece of two-sided, strip-form, touch fastener material having a first longitudinally extended surface from which a multiplicity of fastener elements project;

a second longitudinally extended surface from which a multiplicity of fastener elements project, the elements of the second surface formed to mate with the elements of the first surface to form a disengageable fastening there being respective fastener elements substantially throughout the length of the respective extended surfaces, which results in the strap being adjustable; and at least one pair of spaced slots sized in length and positioned to pass the cord through the slots, with the strap material between the slots securing the strap to the cord;

the strap being flexible and constructed and arranged such that in the wrapped state the fastener elements on the first and second surfaces form a disengageable fastening to secure the strap about the bundle; the method comprising the steps of inserting the cord through the pair of slots in the strap and allowing the strap to remain attached to the cord when the cord is extended during use of the cord to deliver power; and after such use, forming said cord into a bundle of adjacent loops; and wrapping said strap about the bundle such that the fastener elements on the first surface of the touch fastener material engage the fastener elements on the second surface of the touch fastener material to form a fastening.

13. The method of claim 12 in which the strap is of flat sheet form having first and second opposite faces, the first extended surface comprising substantially the entire face of the strap; and the second extended surface comprising substantially the entire opposite face of the strap;

material forming the fastener elements of the first and second surfaces being bonded throughout the extend of the strap.

14. The method of claim 13 in which the fasteners of the first surface are of molded synthetic resin, and sheet material carrying the fasteners of the second surface is intimately bonded by portions of synthetic resin integral with fastener elements of said first surface.

15. The method of claim 12 in which the fastener elements of said first surface are hook-shaped and the fastener elements of said second surface are loops provided on the surface of the fabric, the method comprising engaging said loops by said hook-shaped fastener elements.

16. The method of claim 12 in which said slots comprise slits cut in the substance of said strap without removal of material.

* * * * *